(12) United States Patent
Liu et al.

(10) Patent No.: US 12,282,244 B2
(45) Date of Patent: Apr. 22, 2025

(54) SMA WIRE DRIVING DEVICE, CLOSED-LOOP CONTROL METHOD THEREOF AND ELECTRONIC DEVICE

(71) Applicant: Henan Hozel Electron Inc., Henan (CN)

(72) Inventors: Shulun Liu, Guangdong (CN); Shubiao Ji, Guangdong (CN); Yaoqian Cai, Guangdong (CN)

(73) Assignee: HENAN HOZEL ELECTRON INC., Henan (CN)

( * ) Notice: Subject to any disclaimer, the term of this patent is extended or adjusted under 35 U.S.C. 154(b) by 0 days.

(21) Appl. No.: 17/795,007

(22) PCT Filed: Aug. 11, 2021

(86) PCT No.: PCT/CN2021/111989
§ 371 (c)(1),
(2) Date: Jul. 25, 2022

(87) PCT Pub. No.: WO2022/267195
PCT Pub. Date: Dec. 29, 2022

(65) Prior Publication Data
US 2024/0219813 A1    Jul. 4, 2024

(30) Foreign Application Priority Data
Jun. 23, 2021  (CN) .......................... 202110697621.X (51) Int. Cl.
*G03B 13/36* (2021.01)
*G02B 7/09* (2021.01)
*G02B 27/64* (2006.01)

(52) U.S. Cl.
CPC .............. *G03B 13/36* (2013.01); *G02B 7/09* (2013.01); *G02B 27/646* (2013.01); *G03B 2205/0076* (2013.01)

(58) Field of Classification Search
CPC .... G03B 13/36; G03B 2205/007; G02B 7/09; G02B 27/646
See application file for complete search history.

(56) References Cited

U.S. PATENT DOCUMENTS 9,388,799 B2 * 7/2016 Easton .................... F03G 7/065
11,519,947 B2 * 12/2022 Easton .................... G02B 7/02
(Continued)

FOREIGN PATENT DOCUMENTS

| CN | 101253278 A | 8/2008 |
| CN | 101441305 A | 5/2009 |

(Continued)

OTHER PUBLICATIONS

International Search Report for PCT/CN2021/111989 mailed Mar. 23, 2022, ISA/CN.

*Primary Examiner* — Cynthia Segura
(74) *Attorney, Agent, or Firm* — NKL Law; Allen Xue (57) ABSTRACT

An SMA wire driving device, a closed-loop control method thereof and an electronic device are provided, which relates to the technical field of actuators. The SMA wire driving device includes a stationary part, a movable part being movable relative to the stationary part, and an SMA wire configured to drive the movable part to move relative to the stationary part, where a sampling resistor is connected in series with the SMA wire. By the SMA wire driving device, a displacement of the movable part relative to the stationary part can be detected by acquiring a voltage of the sampling resistor connected in series with the SMA wire. Based on the SMA wire driving device, a closed-loop control method is further provided, which has a small computation amount, so that the SMA wire can be rapidly controlled, improving driving effect of the SMA wire driving device.

8 Claims, 7 Drawing Sheets

(56) References Cited

U.S. PATENT DOCUMENTS

| | | | |
|---|---|---|---|
| 2006/0048511 A1 | 3/2006 | Everson et al. | |
| 2008/0190186 A1 | 8/2008 | Sizer et al. | |
| 2008/0247748 A1 | 10/2008 | Tanimura | |
| 2008/0278030 A1 | 11/2008 | Hara et al. | |
| 2009/0009656 A1 | 1/2009 | Honda et al. | |
| 2010/0326070 A1 | 12/2010 | Hao et al. | |
| 2015/0260169 A1* | 9/2015 | Easton | G03B 3/10 60/527 |
| 2015/0304561 A1* | 10/2015 | Howarth | G02B 7/026 348/374 |
| 2016/0209670 A1* | 7/2016 | Brown | G03B 3/10 |
| 2018/0031854 A1* | 2/2018 | Hu | G03B 3/10 |
| 2018/0348593 A1 | 12/2018 | Brown | |
| 2019/0120214 A1 | 4/2019 | Brown et al. | |
| 2021/0190842 A1 | 6/2021 | Easton | |
| 2023/0296731 A1* | 9/2023 | Carr | G01S 17/894 356/4.01 |

FOREIGN PATENT DOCUMENTS

| | | | |
|---|---|---|---|
| CN | 101936275 A | | 1/2011 |
| CN | 104982028 A | | 10/2015 |
| CN | 108292074 A | | 7/2018 |
| CN | 109312727 A | | 2/2019 |
| CN | 109959999 A | | 7/2019 |
| CN | 110955010 A | | 4/2020 |
| CN | 111201376 A | | 5/2020 |
| CN | 212207804 U | | 12/2020 |
| CN | 112901434 A | | 6/2021 |
| CN | 113534395 A | | 10/2021 |
| CN | 113534570 A | | 10/2021 |
| JP | 2006-183564 | * | 7/2006 |
| JP | 2006183564 A | | 7/2006 |
| JP | 2006283837 A | | 10/2006 |
| JP | 2017096144 A | | 6/2017 |
| WO | 2019159754 A1 | | 8/2019 |

* cited by examiner

SMA WIRE DRIVING DEVICE, CLOSED-LOOP CONTROL METHOD THEREOF AND ELECTRONIC DEVICE

This application is the national phase of International Patent Application No. PCT/CN2021/111989, titled "SMA WIRE DRIVING DEVICE, CLOSED-LOOP CONTROL METHOD THEREOF AND ELECTRONIC DEVICE", filed on Aug. 11, 2021, which claims the priority to Chinese Patent Application No. 202110697621.X, titled "SMA WIRE DRIVING DEVICE, CLOSED-LOOP CONTROL METHOD THEREOF AND ELECTRONIC DEVICE", filed on Jun. 23, 2021 with the Chinese Patent Office, both of which are incorporated herein by reference in their entireties.

FIELD

The present disclosure relates to the technical field of actuators, and in particular to an SMA wire driving device, a closed-loop control method thereof and an electronic device.

BACKGROUND

The shape memory alloy (SMA) has a characteristic of thermal shrink when being applied with a current. Due to the advantages of a large shrink force, a small volume and a good durability, the SMA is widely used as driving components in actuators, such as focusing devices and/or anti-shaking devices of cameras in intelligent electronic devices. In the electronic device, a processor changes a driving signal applied to an SMA wire to control the SMA wire to strain (i.e., shrink) in a varying degree to pull a movable part to move, so that the movable part drive a lens or other components to move, to realize the focusing, anti-shaking or other motions of the camera.

For the movement of the lens for focusing or anti-shaking, for example, the movement speed of the lens is normally more preferentially considered than the movement accuracy of the lens, which brings a high requirement on the speed of computation for the control of the SMA wire, in order to instantaneously adjust a degree of strain of the SMA wire. The computation is on a basis of detection of a displacement of the movable part connected with the SMA wire relative to the stationary part.

In the conventional technology, the displacement of the movable part connected with the SMA wire relative to the stationary part may be detected in various ways. For example, a position sensor is arranged to detect the displacement. Alternatively, the resistance of the SMA wire is measured and the resistance is converted into a degree of the strain of the SMA wire, to calculate the displacement of the movable part relative to the stationary part. The former way requires more spaces for arranging the position sensor. The latter way requires complex computation, resulting in a slow processing speed of the processor, and thus affecting the response speed of the SMA wire, which is disadvantageous for achieving rapid anti-shaking, and thus affects the quality of optical anti-shaking.

SUMMARY

In order to solve the above technical problems in the conventional technology, the present disclosure provides a SMA wire driving device, with which a displacement of a movable part relative to a stationary part can be acquired by measuring a voltage of a sampling resistor connected in series with the SMA wire. In addition, based on the SMA wire driving device, a closed-loop control method for the SMA wire driving device is further provided according to the present disclosure. The control method has a small amount of computation, so that the SMA wire can be rapidly adjusted and controlled, thereby improving the movement speed of the movable part relative to the stationary part. An electronic device is further provided according to the present disclosure.

An SMA wire driving device is provided according to an embodiment of a first aspect of the present disclosure. The SMA wire driving device includes a stationary part, a movable part, and an SMA wire. The movable part is movable relative to the stationary part. The SMA wire is configured to drive the movable part to move relative to the stationary part. A sampling resistor is connected in series with the SMA wire.

The SMA wire driving device according to the embodiment of the present disclosure has at least the following beneficial effects.

The electrical characteristics of the SMA wire are complex. By the above solution, the sampling resistor is connected in series with the SMA wire, and a voltage of a power supply connected at two ends of the SMA wire is unchanged. Since the voltage of the power supply is unchanged and the sampling resistor is connected in series with the SMA wire, a strain of the SMA wire is related to a voltage of the sampling resistor. In order to detect the strain of the SMA wire, it is only required to detect the voltage of the sampling resistor and then perform simple conversion on the detected voltage, without requiring a position sensor and detecting an electrical characteristic of the SMA wire, so as to reduce the amount of computation, and improve the speed of computation. Therefore the driving signal applied to the SMA wire can be rapidly adjusted.

According to some embodiments of the present disclosure, the SMA wire driving device further includes multiple SMA wire pairs. Each of the SMA wire pair includes two SMA wires provided for a degree of freedom, and configured to respectively drive the movable part to move in two opposite directions in the degree of freedom relative to the stationary part.

According to some embodiments of the present disclosure, in each of the SMA wire pairs, the two SMA wires are connected in parallel with each other and are controllable independently to each other, and a sampling resistor is connected in series with a branch formed by the two SMA wires connected in parallel with each other.

A closed-loop control method for an SMA wire driving device is provided according to an embodiment of a second aspect of the present disclosure. The closed-loop control method includes:

acquiring a first voltage $V_1$ of a sampling resistor under a condition that the sampling resistor is connected in series with only one SMA wire in an SMA wire pair;

acquiring a second voltage $V_2$ of the sampling resistor under a condition that the sampling resistor is connected in series with only the other SMA wire in the SMA wire pair;

acquiring a current voltage reciprocal difference of the sampling resistor according to the first voltage $V_1$ and the second voltage $V_2$, where the current voltage reciprocal difference is acquired as $$\frac{1}{V_1} - \frac{1}{V_2};$$

acquiring a target voltage reciprocal difference of the sampling resistor according to a target displacement, where the target displacement represents a displacement to be made by a movable part to move to a predetermined position relative to a stationary part;

acquiring a deviation of the current voltage reciprocal difference from the target voltage reciprocal difference; and if the deviation is greater than a threshold, repeatedly adjusting driving signals applied to the SMA wires and acquiring the current voltage reciprocal difference in responses to the adjusted driving signals, until the deviation is less than the threshold.

The closed-loop control method for an SMA wire driving device according to the embodiment of the present disclosure has at least the following beneficial effects.

In a case that an input voltage of the SMA wire is unchanged and the sampling resistor is connected in series with the SMA wire, the strain of the SMA wire is linear with a reciprocal of the voltage of the sampling resistor 400. Therefore, during a process of the movable part moving relative to the stationary part, a displacement of the movable part relative to the stationary part may be acquired by detecting the voltage of the sampling resistor connected in series with the SMA wire, so as to greatly reduce the amount of computation. Therefore, the driving signals applied to the SMA wires can be rapidly adjusted according to the detection data, thereby effectively improving the accuracy of the control, and thus improving the driving effect of the SMA wire driving device.

According to some embodiments of the present disclosure, the process of acquiring a target voltage reciprocal difference of the sampling resistor according to a target displacement includes: acquiring a first target voltage $V_1'$ and a second target voltage $V_2'$ of the sampling resistor according to the target displacement; and calculating the target voltage reciprocal difference according to the first target voltage $V_1'$ and the second target voltage $V_2'$, where the target voltage reciprocal difference is calculated as $$\frac{1}{V_1'} - \frac{1}{V_2'}.$$

According to some embodiments of the present disclosure, the closed-loop control method for an SMA wire driving device further includes: reducing, in a case that the deviation is less than the threshold, amplitudes of adjusting the driving signals applied to the SMA wires, to maintain the driving signals applied to the SMA wires in target dynamic ranges.

According to some embodiments of the present disclosure, the closed-loop control method for an SMA wire driving device further includes: detecting voltage reciprocal differences of the sampling resistor under conditions of different displacements of the movable part relative to the stationary part, and acquiring a relationship between a displacement and a voltage reciprocal difference.

According to some embodiments of the present disclosure, the closed-loop control method for an SMA wire driving device further includes: detecting displacements of the movable part relative to the stationary part under conditions of different voltage reciprocal differences of the sampling resistor, and acquiring a relationship between a displacement and a voltage reciprocal difference.

According to some embodiments of the present disclosure, the closed-loop control method for an SMA wire driving device further includes: acquiring the target displacement of the movable part relative to the stationary part, and acquiring the voltage reciprocal difference corresponding to the target displacement according to the relationship between the displacement and the voltage reciprocal difference.

An electronic device is provided according to an embodiment of a third aspect of the present disclosure. The electronic device includes at least one processor and a memory in communication connection with the at least one processor. The memory stores instructions. The instructions, when being executed by the at least one processor, cause the at least one processor to perform the closed-loop control method for an SMA wire driving device according to the second aspect of the present disclosure.

The additional aspects and advantages of the present disclosure are further described in the following description, which become clear from the following description or be understood through the embodiments of the present disclosure.

BRIEF DESCRIPTION OF THE DRAWINGS

The above and/or additional aspects and advantages of the present disclosure will become clear from the description of the embodiments in conjunction with the following drawings, in which.

Reference signs are listed as follows:

| 100 Stationary part; | 200 Movable part; |
|---|---|
| 300 SMA wire; | 400 Sampling resistor. |

DETAILED DESCRIPTION

The embodiments of the present disclosure are described in detail hereinafter, and are illustrated in drawings, in which the same or similar reference signs represent the same or similar elements or elements having the same or similar functions. The embodiments described in the following with reference to the drawings are only exemplary embodiments, which are used to explain the disclosed technical solution, and should not be construed as limitations.

In the present disclosure, it should be understood that the orientation or positional relationship indicated by the terms of up, down, left, right, front or back is based on the orientation or positional relationship shown in the drawings, which is only to simplify the description, rather than indicating or implying that the device or element referred to must have a specific orientation, or must be constructed and operated in a particular orientation, and therefore cannot be understood as limitations.

In the description of the present disclosure, the terms of first and second are only used to distinguish the technical features, rather than implying a relative importance, or implying the number of the indicated technical features, or implying an order of the indicated technical features.

In the description of the present disclosure, unless otherwise expressly specified, words such as arrangement, installation and connection shall be understood in a broad sense. Those skilled in the art may reasonably determine meanings of the above words in the present disclosure in combination with contents of the technical solutions.

An SMA wire driving device according to an embodiment of a first aspect of the present disclosure is described below with reference to FIGS. 1 to 6.

As shown in FIGS. 1 to 4, an SMA wire driving device includes a stationary part 100, a movable part 200 and an SMA wire 300. The movable part 200 is movable relative to the stationary part 100. The SMA wire 300 is configured to drive the movable part 200 to move relative to the stationary part 100. A sampling resistor 400 is connected in series with the SMA wire 300.

The shape memory alloy (SMA) may have the martensite phase and the austenite phase, and even the R-phase in some cases. A change of a temperature of the SMA leads to phase transformation of internal structure, thereby causing a strain. In a case that a driving signal is applied to the SMA wire 300 to generate stain of the SMA wire 300, the SMA wire 300 is normally in a two-phase mixed state of having both the martensite phase and the austenite phase. When applying a driving signal to the SMA wire 300 in the two-phase mixed state, a change of a temperature of the SMA wire 300 is linear with the strain.

It may be understood that the SMA wire 300 may be connected to the stationary part 100 and the movable part 200 in the following ways, but is not limited thereto. Two ends of the SMA wire 300 may be fixed to the stationary part 100, and the movable part 200 may be hooked to a middle part of the SMA wire 300. Alternatively, an end of the SMA wire 300 is fixed to the stationary part 100 and another end of the SMA wire 300 is fixed to the movable part 200.

It should be understood that in the above arrangement, the sampling resistor 400 is connected in series with the SMA wire 300. It should be understood that the sampling resistor 400 has constant resistance. Since the voltage of the power supply is unchanged and the sampling resistor is connected in series with the SMA wire 300, the change of the temperature of the SMA wire 300 in strain is related to a reciprocal of a voltage of the sampling resistor 400. In order to detect the strain of the SMA wire 300, it is only required to detect the voltage of the sampling resistor 400 and then perform simple conversion on the detected voltage, without requiring a position sensor, so as to save space. In addition, it is not required to detect an electrical characteristic of the SMA wire 300, and also not required to convert the electrical characteristic into the temperature of the SMA wire 300, so as to reduce the amount of computation and improve the speed of computation. Therefore, the driving signal applied to the SMA wire 300 can be rapidly adjusted, thereby improving a movement speed of the movable part 200 relative to the stationary part 100.

Figure 1:
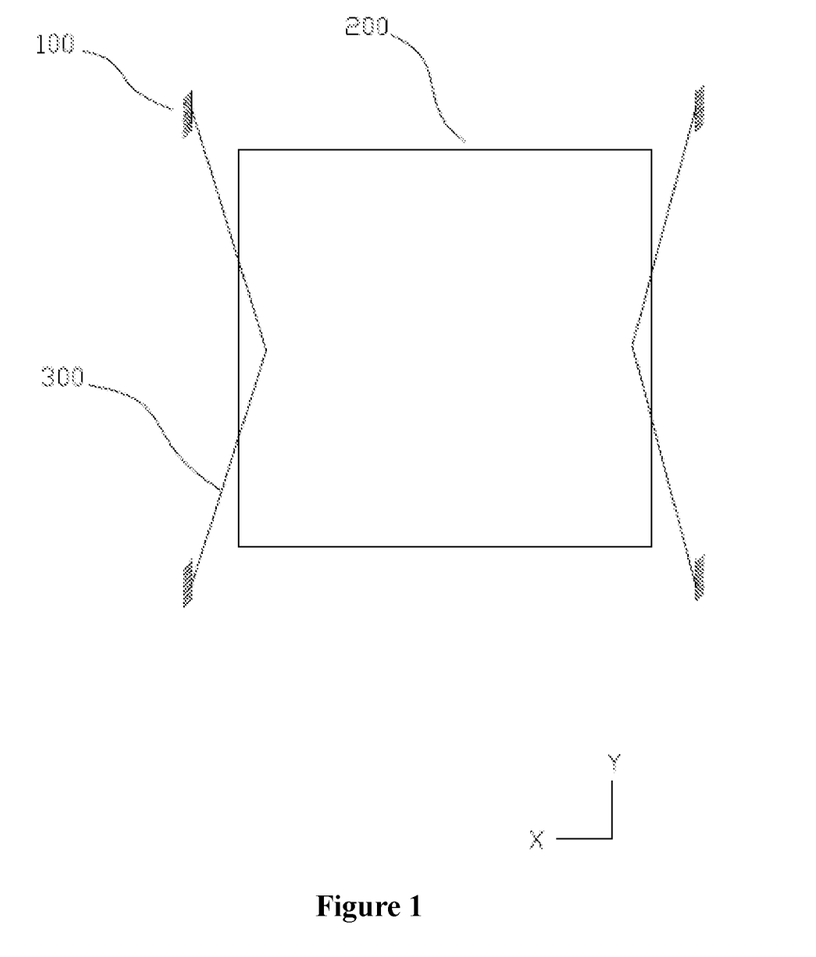
FIG. 1 is a schematic diagram of an SMA wire driving device according to an embodiment of the present disclosure.
Figure 2:
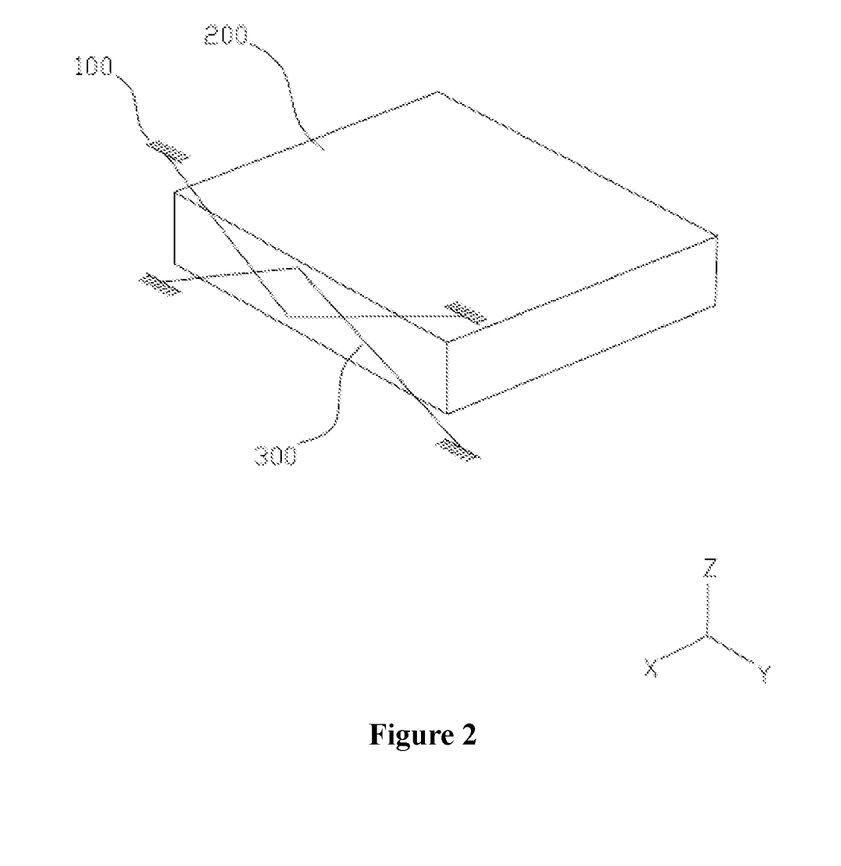
FIG. 2 is a schematic diagram of an SMA wire driving device according to an embodiment of the present disclosure.
Figure 3:
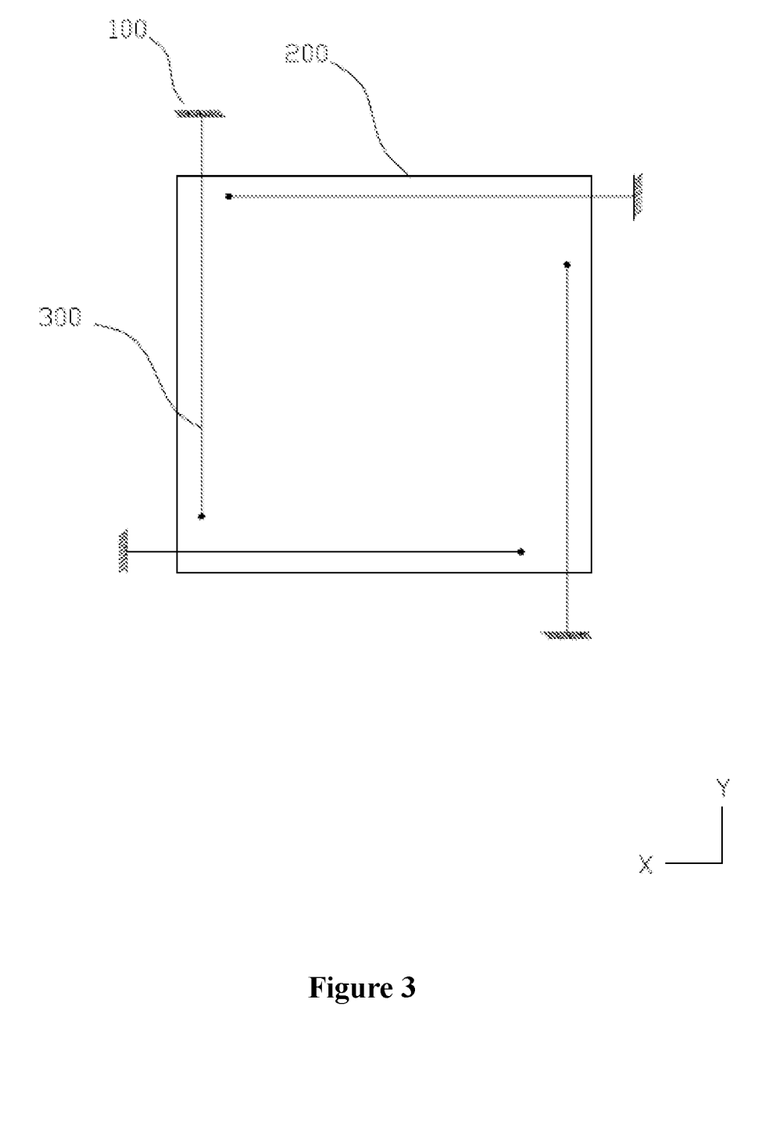
FIG. 3 is a schematic diagram of an SMA wire driving device according to an embodiment of the present disclosure.
Figure 4:
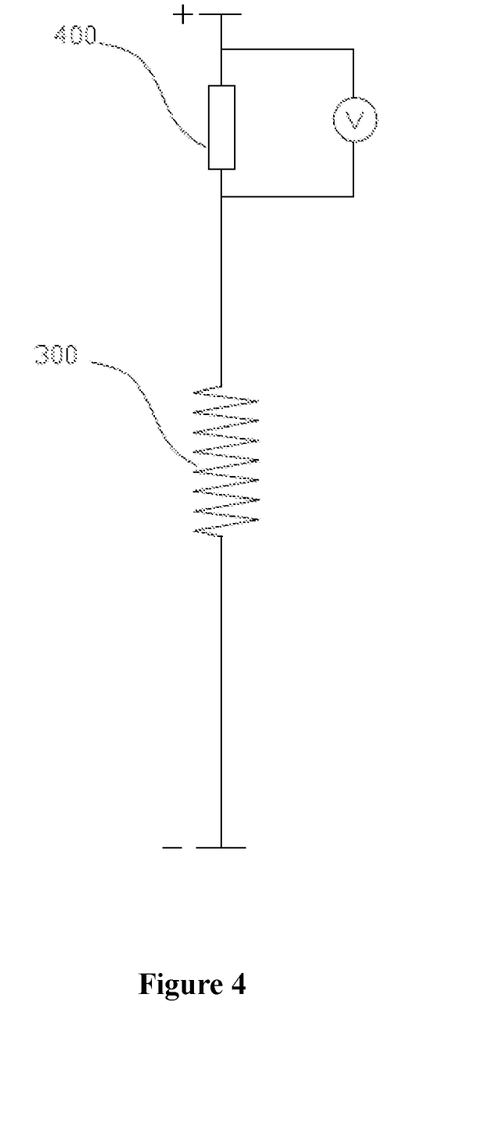
FIG. 4 is a schematic diagram showing a sampling resistor connected in series with an SMA wire according to an embodiment of the present disclosure.

As shown in FIGS. 1 to 3, in some embodiments of the present disclosure, the SMA wire driving device includes multiple SMA wire pairs. Each of the SMA wire pairs includes two SMA wires 300 provided for a degree of freedom, and configured to respectively drive the movable part 200 to move in two opposite directions in the degree of freedom relative to the stationary part 100.

It can be understood that two SMA wires 300 are provided for a same degree of freedom, so that the movement of the movable part 200 relative to the stationary part 100 is more controllable, so as to improve a movement accuracy of the movable part 200 relative to the stationary part 100.

As shown in FIGS. 1 to 3, in a case that the movable part 200 is required to move in an X-axis direction or a Y-axis direction relative to the stationary part 100, two SMA wires 300 may be arranged in the X-axis direction or the Y-axis direction. In a case that the movable part 200 is required to move in a Z-axis direction relative to the stationary part 100, two SMA wires 300 may be arranged in the Z-axis direction. Alternatively, the movable part 200 is required to rotate about the Z-axis relative to the stationary part 100, two SMA wires 300 may be symmetrically arranged around a rotation point, so that the movable part 200 may rotate around the rotation point relative to the stationary part 100. It should be noted that the arrangement of the SMA wire 300 in the SMA wire driving device is not limited herein.

During a process of the movable part 200 moving relative to the stationary part 100, each of the SMA wires 300 may be controlled in the following manners.

For example, the movable part 200 moves in the X-axis direction relative to the stationary part 100. In this embodiment, two SMA wires 300 are arranged in the X-axis direction. The processor initially applies a driving signal to both of the two SMA wires 300, to control the two SMA wires 300 to be in a tensioned state, and then increases the amplitude of a driving signal applied to one of the two SMA wires 300 and decreases the amplitude of a driving signal applied to the other SMA wire 300, so that the tension of the SMA wire 300 applied with the increased driving signal is gradually increased, while the SMA wire 300 applied with the decreased driving signal is gradually relaxed. Therefore, the movable part 200 moves towards the side of the SMA wire 300 with the increased tension relative to the stationary part 100. It should be noted that although the SMA wire 300 applied with the decreased driving signal is gradually relaxed, the SMA wire 300 is still in the tensioned state, only the tension being reduced, so as to prevent the SMA wire 300 from leaving a predetermined arrangement position during the process of the movable part 200 moving relative to the stationary part 100.

Figure 5:
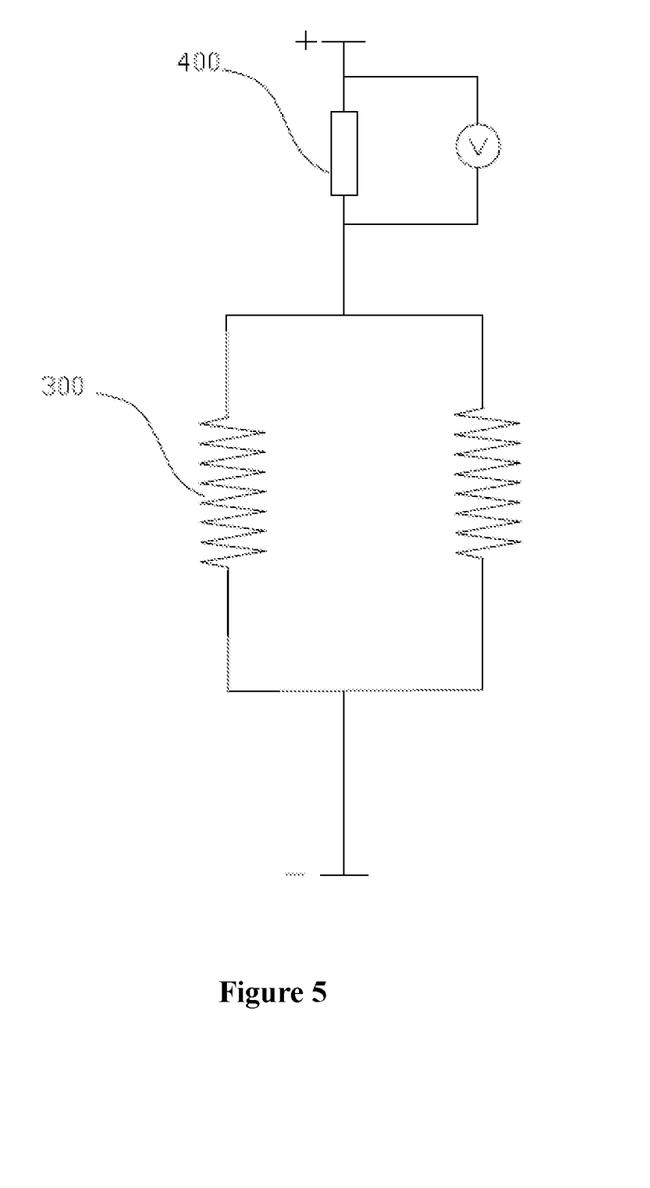
FIG. 5 is a schematic diagram showing a sampling resistor connected in series with a branch formed by SMA wires connected in parallel with each other according to an embodiment of the present disclosure.
Figure 6:
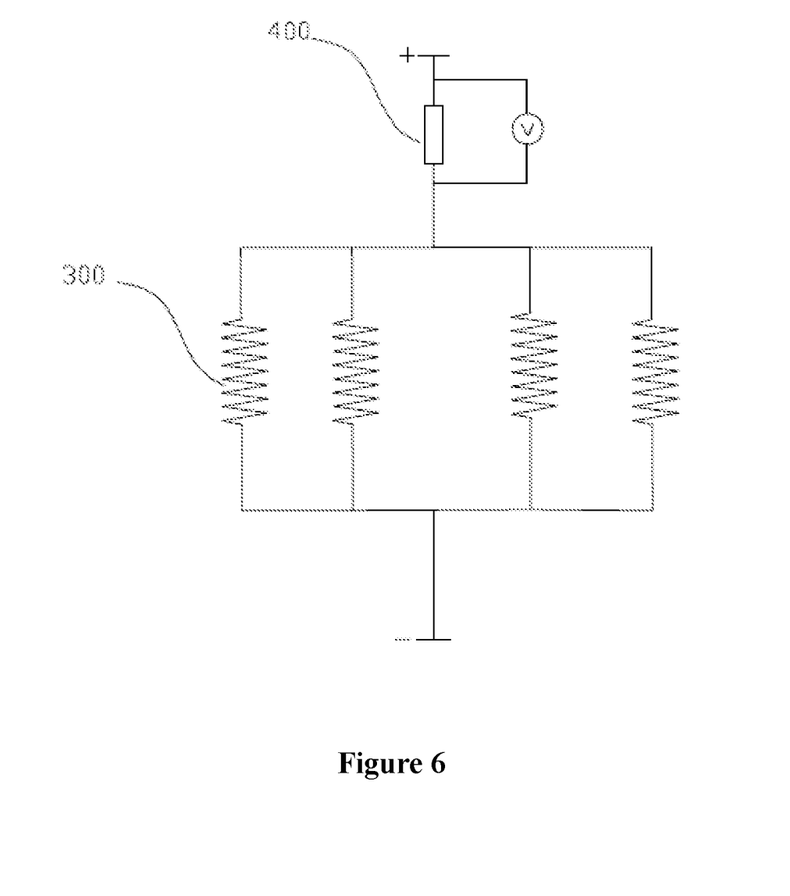
FIG. 6 is a schematic diagram showing a sampling resistor connected in series with a branch formed by SMA wires connected in parallel with each other according to another embodiment of the present disclosure.

As shown in FIGS. 5 and 6, in some embodiments of the present disclosure, the two SMA wires 300 in an SMA wire pair are connected in parallel with each other and controllable independently to each other, and a sampling resistor 400 is connected in series with a branch formed by the two SMA wires 300 connected in parallel with each other.

It can be understood that the SMA wires 300 are connected in parallel with each other and controllable independently to each other. Since each of the SMA wires 300 may be controlled independently, in a case that the SMA wires 300 other than a first SMA wire 300 are controlled to be in an open circuit state, the sampling resistor 400 is connected in series with only the first SMA wire 300. Therefore, a temperature of the SMA wire 300 connected in series with the sampling resistor 400 may be acquired by measuring the voltage of the sampling resistor 400, so as to acquire the strain of the SMA wire 300. In this way, the number of the sampling resistors 400 can be reduced and the layout of the circuit can be simplified.

It can be understood that multiple SMA wire pairs may be arranged. In the case of multiple SMA wire pairs, SMA wires 300 in each of the SMA wire pairs are connected in parallel with each other, and the multiple SMA wire pairs are connected in parallel with each other. The sampling resistor 400 is arranged on a branch formed by all the SMA wires 300 connected in parallel with each other.

Figure 7:
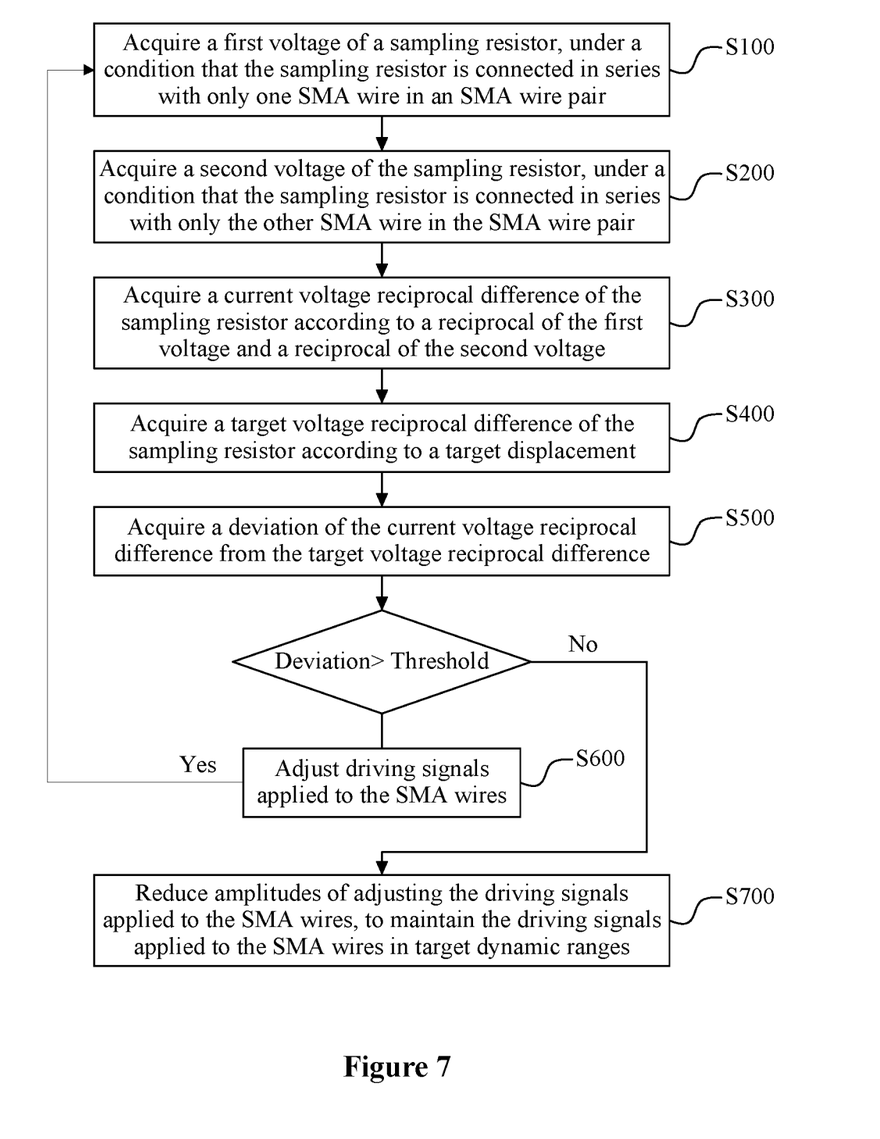
FIG. 7 is a flow chart of a closed-loop control method for an SMA wire driving device according to another embodiment of the present disclosure.

As shown in FIG. 7, a closed-loop control method for an SMA wire driving device is provided according to an embodiment of a second aspect of the present disclosure. The closed-loop control method includes:

acquiring a first voltage $V_1$ of a sampling resistor 400 under a condition that the sampling resistor 400 is connected in series with only one SMA wire 300 in an SMA wire pair;

acquiring a second voltage $V_2$ of the sampling resistor 400 under a condition that the sampling resistor is only connected in series with the other SMA wire 300 in the SMA wire pair;

acquiring a current voltage reciprocal difference of the sampling resistor 400 according to the first voltage $V_1$ and the second voltage $V_2$, where the current voltage reciprocal difference is acquired as $$\frac{1}{V_1} - \frac{1}{V_2};$$

acquiring a target voltage reciprocal difference of the sampling resistor 400 according to a target displacement, where the target displacement represents a displacement to be made by the movable part 200 to move to a predetermined position relative to the stationary part 100;

acquiring a deviation of the current voltage reciprocal difference from the target voltage reciprocal difference; and if the deviation is greater than a threshold, repeatedly adjusting driving signals applied to the SMA wires 300 and acquiring the current voltage reciprocal difference in responses to the adjusted driving signals, until the deviation is less than the threshold.

It can be understood that an input voltage to the SMA wire is unchanged, and the sampling resistor 400 has constant resistance.

It can be understood that since the SMA wires 300 are controllable independently to each other, in a case that the SMA wires 300 other than a first SMA wire 300 are controlled to be in an open circuit state, the sampling resistor 400 is connected in series with only the first SMA wire 300. An electronic switch may be used to switch connection states of the two SMA wires 300 in the SMA wire pair at an instant, to control the sampling resistor 400 to be connected in series with only one SMA wire 300 in an SMA wire pair at the instant. It should be noted that since the time length of the instant of the switching of the electronic switch is very short, it can be considered that the two SMA wires 300 in the SMA wire pair before the switching of the electronic switch are in a same time instant as after the switching of the electronic switch.

It should be understood that since the sampling resistor 400 is connected in series with the SMA wire 300 and the input voltage to the SMA wire 300 is unchanged, the temperature of the SMA wire 300 is linear with a reciprocal of the voltage of the sampling resistor 400 according to the characteristics of the SMA wire 300. The temperature of the SMA wire 300 may directly reflect the strain of the SMA wire 300.

$T_{W1}$ represents a temperature of one of SMA wires 300 in an SMA wire pair before the movable part 200 moves relative to the stationary part 100, and $T_{W1}'$ represents a temperature of the SMA wire after the movable part 200 moves relative to the stationary part 100. $\Delta T1$ represents a change of the temperature of the SMA wire 300 before and after the movable part 200 moves relative to the stationary part 100, and is calculated by the following equation: $\Delta T1 = T_{W1}' - T_{W1}$. $R_S$ represents the sampling resistor 400. $V_1$ represents a voltage of the sampling resistor 400 before the movable part 200 moves relative to the stationary part 100, and $V_1'$ represents a voltage of the sampling resistor 400 after the movable part 200 moves relative to the stationary part 100. Since $T_{W1}$ is related to $1/V_1$, and $T_{W1}'$ is related to $1/V_1'$, $\Delta T1$ may be calculated from $$\frac{1}{V_1'} - \frac{1}{V_1},$$

that is, the change of the temperature of the SMA wire 300 is linear with a voltage reciprocal difference of the sampling resistor 400. The change of the temperature of the SMA wire 300 is related to the strain of the SMA wire 300, and the strain of the SMA wire 300 may directly reflect a distance that the movable part 200 moves relative to the stationary part 100, i.e., the displacement of the movable part 200 relative to the stationary part 100.

Similarly, for the other SMA wire 300 in the SMA wire pair, $T_{W2}$ represents a temperature of the SMA wire 300 before the movable part 200 moves relative to the stationary part 100, and $T_{W2}'$ represents a temperature of the SMA wire 300 after the movable part 200 moves relative to the stationary part 100. $\Delta T2$ represents a change of the temperature of the SMA wire 300 before and after the movable part 200 moves relative to the stationary part 100. $V_2$ represents a voltage of the sampling resistor 400 before the movable part 200 moves relative to the stationary part 100, and $V_2'$ represents a voltage of the sampling resistor 400 after the movable part 200 moves relative to the stationary part 100. Therefore, $\Delta T2$ may be calculated from $$\frac{1}{V_2'} - \frac{1}{V_2}.$$

When the movable part 200 moves relative to the stationary part 100, one of the SMA wires 300 in an SMA wire pair shrinks and the other SMA wire 300 relaxes. During the process of the movable part 200 moving relative to the stationary part 100, respective temperatures of the two SMA wires 300 in the SMA wire pair change, a temperature difference between the two SMA wires 300 corresponds to a displacement of the movable part 200 relative to the stationary part 100. That is, the temperature difference changes with the movement of the movable member 200 relative to the stationary member 100. For example, during a driving process of the SMA wire driving device, ΔL represents a displacement of the movable part 200 relative to the stationary part 100. Before the displacement occurs, $T_{W1}$ represents a temperature of one of the SMA wires 300 in the SMA wire pair and $T_{W2}$ represents a temperature of the other SMA wire 300 in the SMA wire pair, and a temperature difference between the two SMA wires 300 is $T_{W1}-T_{W2}$. After the displacement occurs, $T_{W1}'$ represents a temperature of one of the SMA wires 300 in the SMA wire pair and $T_{W2}'$ represents a temperature of the other SMA wire in the SMA wire pair, and the temperature difference between the two SMA wires 300 is changed to $T_{W1}'-T_{W2}'$. The displacement of the movable part 200 relative to the stationary part 100 may be reflected by a change of the temperature difference between the two SMA wires 300 before and after the displacement occurs. Moreover, the temperature of the SMA wire 300 is related to the reciprocal of the voltage of the sampling resistor 400. Therefore, the displacement of the movable part 200 relative to the stationary part 100 may be directly acquired from the reciprocals of the voltages of the sampling resistor 400, i.e., $$\left(\frac{1}{V_1'} - \frac{1}{V_2'}\right) - \left(\frac{1}{V_1} - \frac{1}{V_2}\right).$$

Based on the above embodiment, as shown in FIG. 7, the closed-loop control method for the SMA wire driving device may include the following steps S100 to S700.

In step S100, under a condition that the sampling resistor 400 is connected in series with only one SMA wire 300 in an SMA wire pair, a first voltage $V_1$ of the sampling resistor 400 is acquired.

In step S200, under a condition that the sampling resistor 400 is connected in series with only the other SMA wire 300 in the SMA wire pair, a second voltage $V_2$ of the sampling resistor 400 is acquired.

In step S300, a current voltage reciprocal difference of the sampling resistor 400 is acquired according to the first voltage $V_1$ and the second voltage $V_2$. The current voltage reciprocal difference is acquired as $$\frac{1}{V_1} - \frac{1}{V_2}.$$

In step S400, a target voltage reciprocal difference of the sampling resistor 400 is acquired according to a target displacement. The target displacement represents a displacement to be made by the movable part 200 to move to a predetermined position relative to the stationary part 100. It should be noted that the target voltage reciprocal difference may be determined as follows. At the target displacement, under a condition that the sampling resistor 400 is connected in series with one SMA wire 300 in the SMA wire pair, a target voltage of the sampling resistor 400 is $V_1'$, and under a condition that the sampling resistor 400 is connected in series with the other SMA wire 300 in the SMA wire pair, a target voltage of the sampling resistor 400 is $V_2'$. The target voltage reciprocal difference may be acquired as $$\frac{1}{V_1'} - \frac{1}{V_2'}.$$

It should be noted that the target voltage reciprocal difference may be acquired according to a displacement of the movable part 200 relative to the stationary part 100, and stored in the processor. It should be noted that the target voltage reciprocal difference is not a constant, but is acquired according to a displacement that the movable part 200 moves to a predetermined position relative to the stationary part 100.

In step S500, a deviation of the current voltage reciprocal difference from the target voltage reciprocal difference is acquired.

In a case that the deviation is greater than a threshold, step S600 is performed.

In step S600, driving signals applied to the SMA wires 300 are adjusted.

After the driving signals applied to the SMA wires 300 are adjusted, the current voltage reciprocal difference is acquired again. The process is repeated until the deviation is less than the threshold.

The strain of the SMA wire 300 is related to the temperature of the SMA wire 300. According to the conventional technology, in order to detect the temperature of the SMA wire 300, an electrical characteristic of the SMA wire 300 is detected, and then the electrical characteristic is converted into the temperature, so as to acquire the strain of the SMA wire 300. The characteristics of the SMA wire 300 are complex and thus the electrical characteristic is affected by multiple factors. The detection of the electrical characteristic of the SMA wire 300 leads to a large amount of computation and a slow control speed of the controller, which seriously affects the reaction speed and movement speed of the SMA wire driving device. If the SMA wire driving device is arranged in a lens module and serves as an actuator for focusing or anti-shaking, the imaging effect of the lens module is affected. According to the present disclosure, during a process of the movable part 200 moving relative to the stationary part 100, the voltage of the sampling resistor 400 connected in series with an SMA wire 300 in an SMA wire pair is detected, to calculate the displacement of the movable part 200 relative to the stationary part 100, without measuring the real-time electrical characteristic of the SMA wire 300, so as to greatly reduce the amount of computation of the controller. Therefore, the driving signals applied to the SMA wires 300 can be rapidly adjusted according to the detection data, thereby effectively improving the speed and accuracy of the control. This can improve the driving effect of the SMA wire driving device, and thus improve the imaging effect of the lens module when the SMA wire driving device is arranged in the lens module and serves as the actuator for focusing or anti-shaking.

In some embodiments of the present disclosure, the process of acquiring a target voltage reciprocal difference of the sampling resistor 400 according to a target displacement includes: acquiring a first target voltage $V_1'$ and a second target voltage $V_2'$ of the sampling resistor 400 according to the target displacement; and calculating the target voltage reciprocal difference according to the first target voltage $V_1'$ and the second target voltage $V_2'$, where the target voltage reciprocal difference is calculated as $$\frac{1}{V_1'} - \frac{1}{V_2'}.$$

In some embodiments of the present disclosure, in a case that the deviation is less than the threshold, the closed-loop control method for the SMA wire driving device may further include step S700.

In step S700, amplitudes of adjusting the driving signals applied to the SMA wires 300 are reduced, to maintain the driving signals applied to the SMA wires 300 in target dynamic ranges.

It can be understood that when the deviation is less than the threshold, the displacement of the movable part 200 relative to the stationary part 100 reaches the target displacement. In such case, the amplitudes of adjusting the driving signals applied to the SMA wires 300 are reduced, and the driving signals applied to the two SMA wires 300 are required to be maintained in the target dynamic ranges, so that both the two SMA wires 300 are in the tensioned state, in order to fix the movable part 200 relative to the stationary part 100.

In some embodiments of the present disclosure, the closed-loop control method for the SMA wire driving device further includes: detecting displacements of the movable part 200 relative to the stationary part 100 under conditions of different voltage reciprocal differences of the sampling resistor 400, and acquiring a relationship between a displacement and a voltage reciprocal difference.

It can be understood that in order to improve the speed of computation of the processor, the relationship between the displacement and the voltage reciprocal difference may be predetermined.

It can be understood that in a manufacturing process, two SMA wires 300, the movable part 200 and the stationary part 100 may be arranged according to actual situations, and the voltage reciprocal differences of the sampling resistor 400 under conditions of different displacements of the movable part 200 relative to the stationary part 100 may be recorded, so that the relationship between the displacement and the voltage reciprocal difference is acquired, and is stored in the processor.

In this way, the time period of computation of the processor can be saved, thereby improving the speed of the closed-loop control of the SMA wire driving device.

In some embodiments of the present disclosure, the closed-loop control method for the SMA wire driving device further includes: detecting displacements of the movable part 200 relative to the stationary part 100 under conditions of different voltage reciprocal differences of the sampling resistor 400, and acquiring a relationship between the displacement and the voltage reciprocal difference.

It can be understood that the relationship between the voltage reciprocal difference and the displacement may be acquired in other ways.

It can be understood that in a manufacturing process, two SMA wires 300, the movable part 200 and the stationary part 100 may be arranged according to actual situations, driving signals are applies to the SMA wire pairs to acquire a voltage reciprocal difference of the sampling resistor 400. Displacements of the movable part 200 relative to the stationary part 100 under conditions of different voltage reciprocal differences are recorded, so that the relationship between the displacement and the voltage reciprocal difference is acquired, and is stored in the processor.

In some embodiments of the present disclosure, the closed-loop control method for the SMA wire driving device further includes: acquiring a target displacement of the movable part 200 relative to the stationary part 100, and acquiring a voltage reciprocal difference corresponding to the target displacement according to the relationship between the displacement and the voltage reciprocal difference.

It can be understood that before the movable part 200 moves relative to the stationary part 100, the processor may acquire a compensation distance for anti-shaking. The compensation distance for anti-shaking is taken as the target displacement of the movable part 200 relative to the stationary part 100. According to the acquired target displacement, the voltage reciprocal difference corresponding to the target displacement is acquired from the relationship between the voltage reciprocal difference and the displacement, and is determined as the target voltage reciprocal difference. In this way, the time period of computation of the processor can be saved, thereby improving the speed of the closed-loop control of the SMA wire driving device.

An electronic device is provided according to an embodiment of a third aspect of the present disclosure. The electronic device includes at least one processor and a memory in communication connection with the at least one processor. The memory stores instructions. The instructions, when being executed by the at least one processor, cause the at least one processor to perform the closed-loop control method for the SMA wire driving device.

It can be understood that the electronic device may be any type of intelligent terminal, such as a mobile phone, a tablet computer, a driving recorder, and a personal computer.

It can be understood that the electronic device includes one or more processors and a memory. The processors may be in communication connection with the memory by a bus or other ways. As a non-transient computer readable storage medium, the memory may be used to store a non-transient software program, a non-transient computer executable program or unit, such as program instructions/units corresponding to the electronic device in the embodiment of the present disclosure. The processor performs various functional applications and data processing by running the non-transient software program, the instructions or the unit stored in the memory, to perform the closed-loop control method for an SMA wire driving device according to the above method embodiment. The memory may include a program storage area and a data storage area. The program storage area may store an operating system and an application program required by at least one function. The data storage area may store data created according to the program instructions/units, and the like. In addition, the memory may include a high-speed random access memory, or include a non-volatile memory, such as at least one magnetic disk storage device, a flash memory device, or other non-volatile solid-state storage devices. One or more units are stored in the memory. The one or more units, when being executed by one or more processors, perform the closed-loop control method for an SMA wire driving device according to any one of the above method embodiments.

The embodiments of the present disclosure are described in detail above in conjunction with the drawings. However, the present disclosure is not limited to the above embodiments, and various modifications can be made without departing from the purpose of the present disclosure within the scope of knowledge possessed by those of ordinary skill in the art.

The invention claimed is:

1. A closed-loop control method for a shape memory alloy (SMA) wire driving device, wherein the SMA wire driving device comprises an SMA wire pair, a sampling resistor, a movable part, and a stationary part, comprising:

acquiring a first voltage $V_1$ of the sampling resistor when the sampling resistor is connected in series with only a first SMA wire in the SMA wire pair;

acquiring a second voltage $V_2$ of the sampling resistor when the sampling resistor is connected in series with only a second SMA wire in the SMA wire pair;

acquiring a current voltage reciprocal difference of the sampling resistor according to the first voltage $V_1$ and the second voltage $V_2$, wherein the current voltage reciprocal difference is $$\frac{1}{V_1} - \frac{1}{V_2};$$

acquiring a target voltage reciprocal difference of the sampling resistor according to a target displacement, wherein the target displacement represents a displacement to be made by the movable part to move to a predetermined position relative to the stationary part;

acquiring a deviation of the current voltage reciprocal difference from the target voltage reciprocal difference; and when the deviation is greater than a threshold value, repeatedly adjusting driving signal applied to the SMA wire pair and acquiring the current voltage reciprocal difference in response to the adjusted driving signal, until the deviation is less than the threshold value.

2. The closed-loop control method according to claim 1, wherein the acquiring a target voltage reciprocal difference of the sampling resistor according to a target displacement comprises:

acquiring a first target voltage $V_1'$ and a second target voltage $V_2'$ of the sampling resistor according to the target displacement; and calculating the target voltage reciprocal difference according to the first target voltage $V_1'$ and the second target voltage $V_2'$, wherein the target voltage reciprocal difference is $$\frac{1}{V_1'} - \frac{1}{V_2'}.$$

3. The closed-loop control method according to claim 1, further comprising:

reducing, when the deviation is less than the threshold value, an amplitude of adjusting the driving signal applied to the SMA wire pair to maintain the driving signal applied to the SMA wire pair in a target dynamic range.

4. The closed-loop control method according to claim 1, further comprising:

detecting a plurality of voltage reciprocal differences of the sampling resistor corresponding to a plurality of different displacements of the movable part relative to the stationary part, and acquiring a first relationship between the displacement and the voltage reciprocal difference.

5. The closed-loop control method according to claim 4, further comprising:

acquiring the target displacement of the movable part relative to the stationary part, and acquiring the voltage reciprocal difference corresponding to the target displacement according to the first relationship between the displacement and the voltage reciprocal difference.

6. The closed-loop control method according to claim 1, further comprising:

detecting a plurality of displacements of the movable part relative to the stationary part corresponding to a plurality of different voltage reciprocal differences of the sampling resistor, and acquiring a second relationship between the displacement and the voltage reciprocal difference.

7. The closed-loop control method according to claim 6, further comprising:

acquiring the target displacement of the movable part relative to the stationary part, and acquiring the voltage reciprocal difference corresponding to the target displacement according to the second relationship between the displacement and the voltage reciprocal difference.

8. An electronic device, comprising:

at least one processor; and a memory in communication connection with the at least one processor, wherein the memory stores instructions which, when being executed by the at least one processor, cause the at least one processor to perform the closed-loop control method according to claim 1.

* * * * *